United States Patent [19]

Tabata et al.

[11] Patent Number: 5,082,358
[45] Date of Patent: Jan. 21, 1992

[54] POLYMER OF VINYL-BIPHENYL DERIVATIVE ADAPTED FOR OPTICAL USE

[75] Inventors: Masayoshi Tabata, Sapporo; Nobuo Kushibiki, Ebina; Yoko Yoshinaga, Machida, all of Japan

[73] Assignee: Canon Kabushiki Kaisha, Tokyo, Japan

[21] Appl. No.: 371,647

[22] Filed: Jun. 22, 1989

Related U.S. Application Data

[63] Continuation of Ser. No. 58,842, Jun. 5, 1987, abandoned.

[30] Foreign Application Priority Data

Jun. 6, 1986 [JP] Japan ................ 61-131433
Nov. 11, 1986 [JP] Japan ................ 61-266692

[51] Int. Cl.$^5$ .................... G02B 1/04; C08F 228/04; C08F 216/14
[52] U.S. Cl. .................... 359/642; 526/286; 526/289; 526/292.9; 526/293; 526/296; 526/313; 359/831
[58] Field of Search ............ 526/286, 289, 292.9, 526/293, 296, 313; 350/409; 286

[56] References Cited

U.S. PATENT DOCUMENTS

| | | | |
|---|---|---|---|
| 4,412,050 | 10/1983 | Mehta | 526/266 |
| 4,417,064 | 11/1983 | Mehta | 549/415 |
| 4,518,756 | 5/1985 | Yoshida | 526/313 |
| 4,578,445 | 3/1986 | Sakagami | 526/292.3 |

FOREIGN PATENT DOCUMENTS

| | | |
|---|---|---|
| 60-63208 | 4/1985 | Japan. |
| 60-63213 | 4/1985 | Japan. |
| 61-127704 | 6/1986 | Japan. |
| 61-127708 | 6/1986 | Japan. |

OTHER PUBLICATIONS

Chemical Abstract No. 105(24), 209577z (1986).
Chemical Abstract No. 105(26), 227553t (1986).
Chemical Abstract No. 103(14), 105445x (1985).
Chemical Abstract No. 103(6), 124106f (1985).
Chemical Abstract No. 69(24), 97212f (1968).
Chemical Abstract No. 71(22), 102258y (1969).

*Primary Examiner*—Christopher Henderson
*Attorney, Agent, or Firm*—Fitzpatrick, Cella, Harper & Scinto

[57] ABSTRACT

A polymer of vinyl-biphenyl derivative comprising recurring units of the formula:

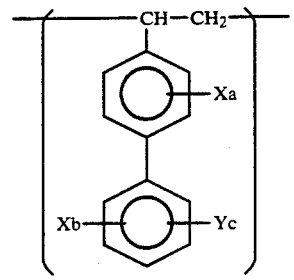

wherein X is Cl or Br; a is an integer of 0–4; Y is —CH$_3$, —OH, —OR, —SR, —SOR, —SO$_2$R, —SeR, —SeOR, —SeO$_2$R, —TeR, —TeOR, or —TeO$_2$R, wherein R is alkyl capable of having a substituent, aryl capable of having a substituent, or

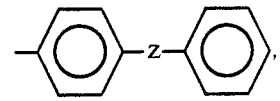

and Z is —CH$_2$—, —C(CH$_3$)$_2$—, —O—, —S—, —SO—, —SeO$_2$—, —Te—, —TeO—, or —TeO$_2$—; b and c are integers giving the sum of 1 to 5, and c is 1 or more. The polymer has a high refractive index and an excellent transparency. Further, the polymer can have a variable refractive index at a constant Abbe's number.

1 Claim, 2 Drawing Sheets

FIG. I

POLYMER OF VINYL-BIPHENYL DERIVATIVE ADAPTED FOR OPTICAL USE

This application is a continuation of application Ser. No. 058,842 filed June 5, 1987, now abandoned.

FIELD OF THE INVENTION AND RELATED ART

The present invention relates to a vinyl polymer having a high refractive index and also an excellent transparency, and more particularly, to a polymer of a vinyl-biphenyl derivative providing a high refractive index resin which can have variable refractive indices at a constant Abbe's number and adapted for optical use, such as optical devices or parts.

Hitherto, inorganic glass has been used to form optical lenses. In recent years, however, a synthetic resin-made optical lens using methyl methacrylate resin has been developed and used partly. While such a synthetic resin-made optical lens is better in respects of productivity, lightness, etc., it has a low refractive index. Moreover, a synthetic resin which has been used heretofore is constituted of a limited number of chemical elements and the Abbe's number thereof is unanimously determined if a refractive index is given, so that it has been impossible to provide a flexible correlation between the refractive index and the Abbe's number. In other words, it has been difficult to select a resin which has a wide range of refractive indices together with a constant Abbe's number or a resin which has a variable Abbe's number together with a constant refractive index.

Herein, Abbe's number $\nu_y$ is defined by the following equation:

$$\nu_d = (n_d - 1)/(n_F - n_C),$$

wherein $n_d$, $n_F$ and $n_C$ relate to refractive indices of an optical material with respect to sodium d line (587.56 nm), hydrogen F line (486.13 nm) and hydrogen C line (656.28 nm). A small Abbe's number represents a large difference in refractive index for different wavelengths, i.e., a large color dispersion, and a large Abbe's number represents the reverse.

It is rare that an optical lens is composed of a single lens. So, if a different refractive index leads to a different dispersion, a complicated compensating optical system is required for compensation of chromatic aberration, so that it becomes difficult to design an entire optical system. However, a high refractive index resin capable of having a variable refractive index while retaining a constant Abbe's number has not been known heretofore.

Another difficulty with known optical resins such as polymethyl methacrylate and polycarbonate is that they can change their refractive index because of moisture absorption.

SUMMARY OF THE INVENTION

An object of the present invention is to provide a vinyl polymer which has a high refractive index and is excellent in transparency.

Another object of the present invention is to provide a vinyl polymer which is little hygroscopic and is stable and uniform regardless of change in environmental conditions.

A further object of the present invention is to provide an optical resin which is capable of having a variable refractive index while retaining a constant Abbe's number.

A still further object of the present invention is to provide an optical device formed of such a vinyl polymer as described above.

According to the present invention, there is provided a polymer of vinyl-biphenyl derivative comprising recurring units of the formula:

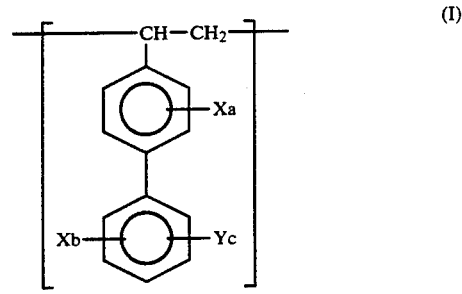

wherein X is a halogen selected from chlorine and bromine; a is an integer of 0-4; Y is a group selected from the group consisting of —CH$_3$, —OH, —OR, —SR, —SOR, —SO$_2$R, —SeR, —SeOR, —SeO$_2$R, —TeR, —TeOR, and —TeO$_2$R, wherein R is a group selected from the group consisting of alkyl capable of having a substituent, aryl capable of having a substituent, and

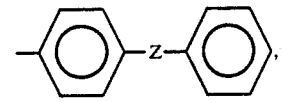

and Z is a divalent group selected from the group consisting of —CH$_2$—, —C(CH$_3$)$_2$—, —O—, —S—, —SO—, —SeO$_2$—, —Te—, —TeO—, and —TeO$_2$—; b and c are integers the sum of which ranges from 1 to 5, and c is an integer of 1 or more.

According to another aspect of the present invention, there is provided an optical device, such as a lens or a prism, which comprises a shaped body of the above polymer.

DETAILED DESCRIPTION OF THE INVENTION

Figure 1:
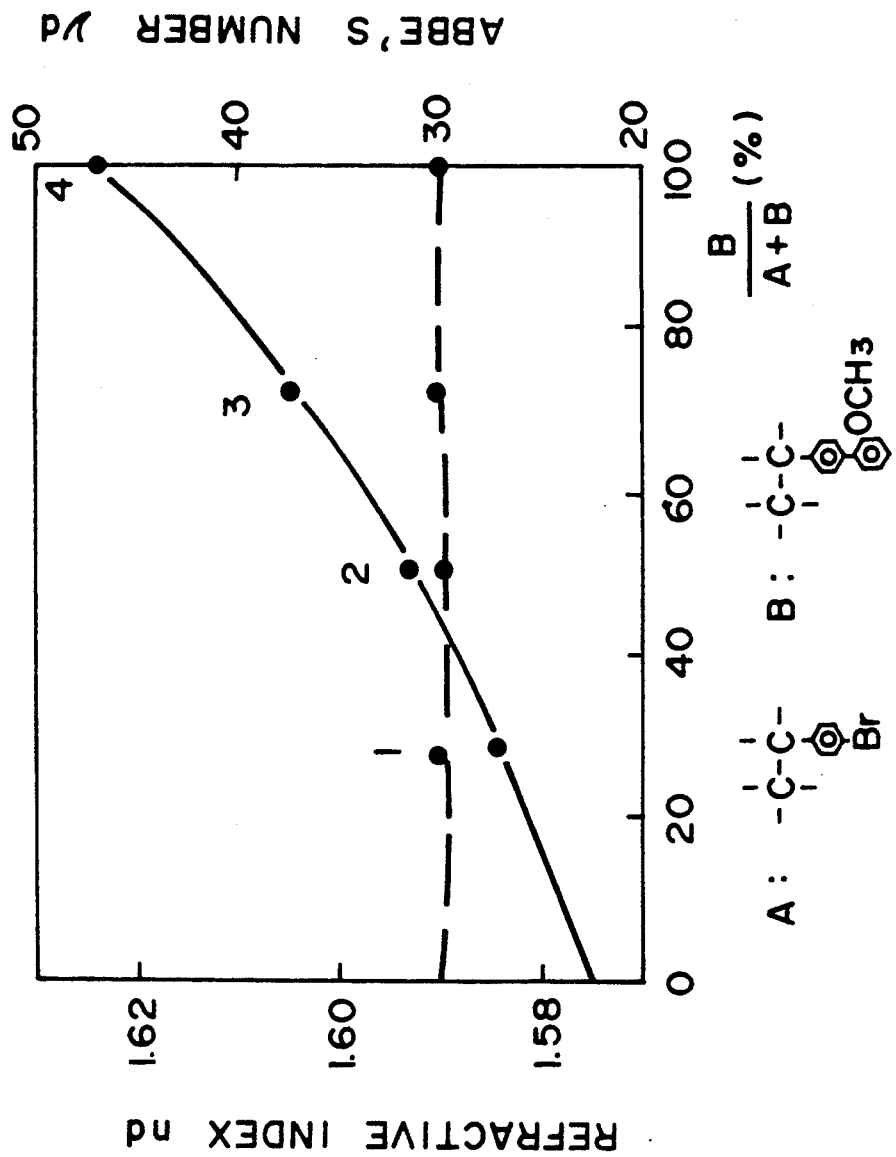
FIG. 1 is a graph showing refractive indices and Abbe's numbers of polymers according to the present invention.

The polymer or resin of the present invention is characterized by comprising the recurring units of vinyl-biphenyl derivative type or biphenylethylene type represented by the above formula (I). A preferred class of the polymer may be given by a group R which is an alkyl group having 1-18 carbon atoms. Another preferred class is given by a group R which is a halogen derivative or carboxylic acid derivative of an aryl group. Further, the group Y may particularly suitably be in the form of —OR or —SR.

The polymer of the present invention may be in the form of not only a homopolymer consisting of the recurring units of the formula (I) but also in the form of a copolymer containing another recurring unit given by a comonomer. Examples of such a comonomer may include: styrene, methyl methacrylate, acrylonitrole, acrylic acid esters (inclusive of methyl, ethyl, butyl and 2-ethylhexyl esters), dienes (such as butadiene and isoprene), vinylpyridine, maleic anhydride and fumaronitrile in a case where the polymer is produced through radical polymerization; and styrene, α-methylstyrene, vinyl ether, epoxy monomers (such as styrene oxide and cyclohexane oxide). These comonomers may be used singly or in combination of two or more species. A particularly preferred class of comonomers include halogenated styrenes giving the following recurring unit:

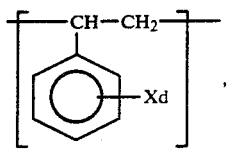

wherein X is a halogen selected from chlorine and bromine, and d is an integer of 1–5.

The polymer of the present invention should comprise 10 or more of the recurring units of the formula (I). Particularly, in the case of a copolymer, the copolymer should preferably comprise 1 or more, particularly 10 or more, of the recurring units of the above formula (I) (biphenylethylene units) per 100 units of the total recurring units (biphenylethylene units and comonomer units). It is preferred that the copolymer is not in the form of a block copolymer. In other words, a random copolymer or a regularly alternating copolymer is preferred.

The optical characteristics of the polymer of the present invention is now explained based on a representative example relating to the following two recurring units:

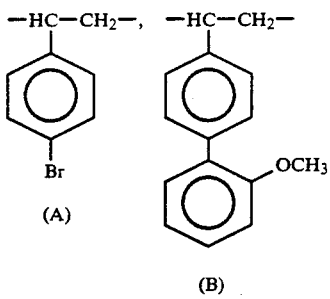

The homopolymer consisting only of the recurring units (A) is poly-p-bromostyrene which can be prepared through cationic polymerization and shows a refractive index of 1.575 and an Abbe's number of 30. The copolymer comprising both the recurring units (A) and (B) has a refractive index which increases up to 1.62 as the content of (B) increases. A copolymer comprising the recurring units of (A) and (B) in a proportion of 50:50 has a refractive index of 1.59. Thus, a series of these polymers have variable refractive indices while retaining a constant Abbe's number of 30.

Further, with respect to the homopolymer consisting only of the basic recurring units of (B), it is possible to easily increase the refractive index up to 1.65 by further introducing a halogen atom or an ether unit into a benzene ring.

Representative examples of the polymer of the present invention will now be raised by way of structural formulas of the recurring units.

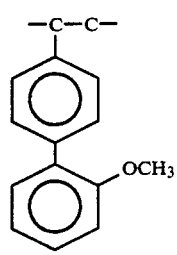 (1)

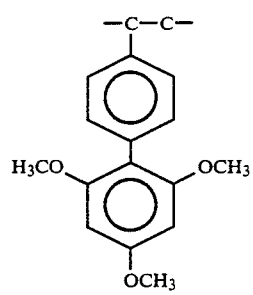 (2)

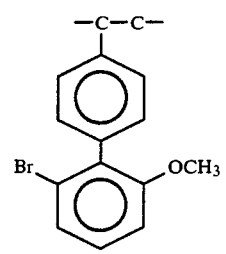 (3)

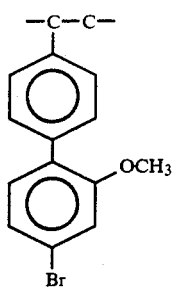 (4)

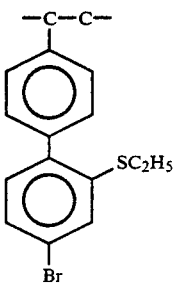 (5)

-continued
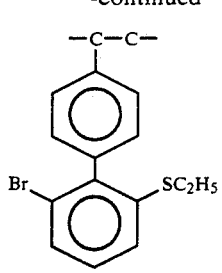 (6)
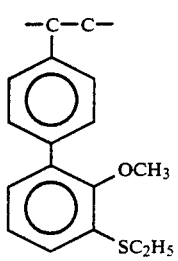 (7)
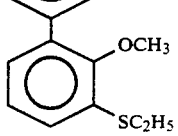
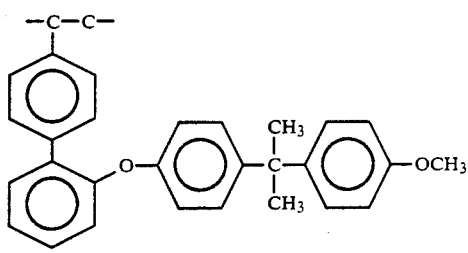 (8)
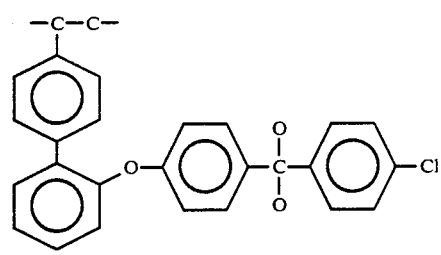 (9)
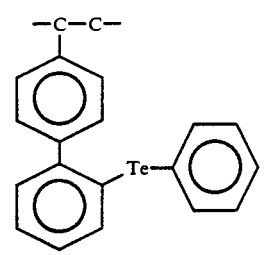 (10)
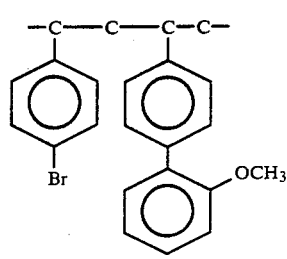 (11)
-continued
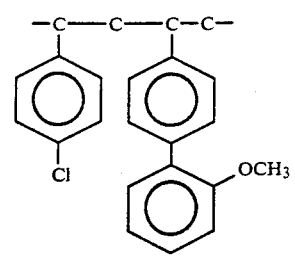 (12)
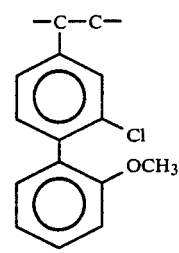 (13)
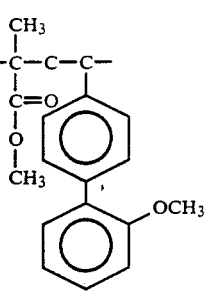 (14)
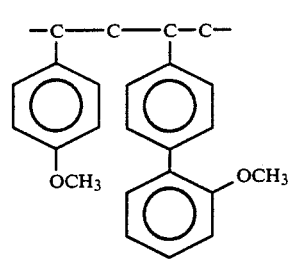 (15)
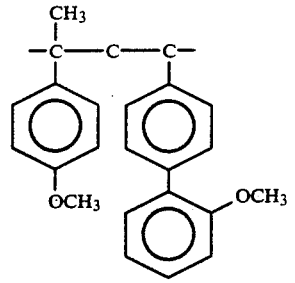 (16)
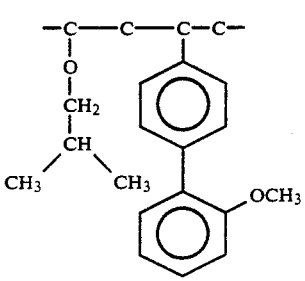 (17)

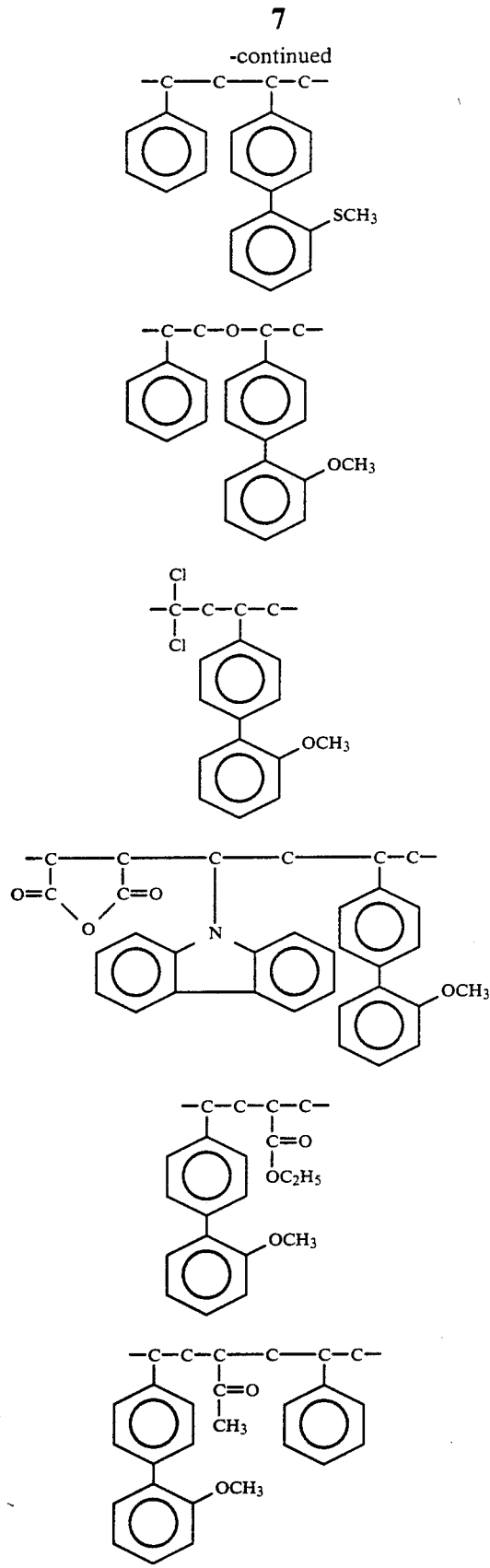

The polymer of the present invention may particularly preferably have a substantially constant Abbe's number and a refractive index in the range of 1.57–1.75. The polymer of the present invention, when used for optical purpose, may preferably be an amorphous polymer. Further, in the case of a copolymer, it is preferred that the copolymer has a polymer chain of a high randomness, because a copolymer having a polymer chain with a high block polymer nature results in nonuniform density which leads to an nonuniform refractive index.

The polymer of the present invention may for example be produced by causing dehalogenation coupling between a halogenated polystyrene and a halogenated methoxybenzene. This reaction is typically conducted in the presence of a catalyst formulation of $NiX_2P(\phi_3)/Et_2Ni/Zn = 1/2/4$. For this purpose, Wurtz reaction using an alkali metal such as Li, Na and K, an alcohlate of the alkali metal, or alkali metal alkyl such as butyllithium, may also be applicable.

The polymer of the present invention may also be formed through polymerization such as radical polymerization and cationic polymerization. The radical polymerization may be effected as a solution polymerization using an organic peroxide, such as benzoyl peroxide, tri-t-butyl peroxide and di-lauroyl peroxide, or as a suspension or emulsion polymerization using a persulfate compound such as sodium persulfate.

The cationic polymerization may be effected by using a Lewis acid or a protonic acid, such as $SnCl_4$, $TiCl_4$, $AlBr_3$, $SbCl_5$, $FeCl_3$, $BF_3O(Et)_2$, and $HClO_4$ as a polymerization initiator. In the cationic polymerization, the performances of the polymerization such as polymerization speed, copolymerization ratio, and stereospecificity are effected by the kind of the polymerization initiator, the solvent, and the polymerization temperature, so that it is necessary to appropriately select these factors to determine the polymerization system.

Among the polymers having the recurring units of the formula (I) above, those falling in the following class are polymers capable showing a high refractive index while retaining a stability against moisture absorption and a transparency: i.e., in the formula (I), a and b are respectively 0, 1 or 2, c is an integer of 1–3, the sum of b and c is an integer of 1–5; Y is a group selected from the group consisting of —$CH_3$, —OH, —OR, —SR, —SOR and —$SO_2R$, wherein R is an aliphatic hydrocarbon group or an aromatic hydrocarbon group each having 1–18 carbon atoms; and the number of the recurring units (n) are 10 or more.

This class of polymers (hereinafter referred to as "vinylbiphenyl polymer") is particularly characterized by a high refractive index in addition to moisture stability and transparency. For example, poly(4-vinyl-4'-alkoxybiphenyl) with a most basic structure shows a refractive index of 1.65. Further, by introducing a halogen group X of chlorine or bromine thereinto, a polymer having a refractive index of 1.70 or higher may be obtained. Incidentally, in all the vinylbiphenyl polymer examples (Examples 8–15) described hereinafter, it has been confirmed that the product polymer shows a refractive index of 1.6 or higher.

The vinylbiphenyl polymer according to the present invention may be produced through vinyl polymerization of the corresponding vinylbiphenyl derivative or through a polymer reaction of converting a monophenyl polymer into a biphenyl polymer. These processes will be explained in order.

Vinyl polymerization

A vinylbiphenyl derivative corresponding to a vinylbiphenyl polymer of the present invention may be prepared, for example, through the following reaction step from a corresponding biphenyl methyl ketone derivative (an example of 4'-substituted derivative is shown, but other types of substituted derivatives may be similarly obtained).

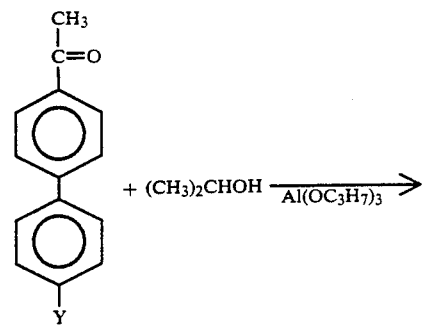

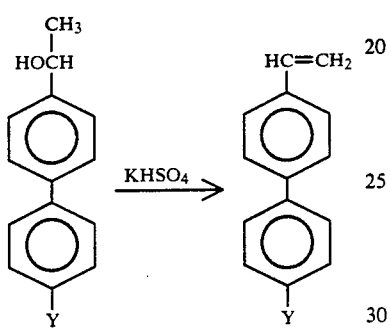

The vinylbiphenyl polymer of the present invention may be produced by polymerizing a vinylbiphenyl derivative monomer obtained as described above. More specifically, the following polymerization processes can be adopted.

Radical Polymerization

Solution homogeneous polymerization, suspension polymerization, emulsion polymerization, etc., may be applicable by using a polymerization initiator inclusive of an organic peroxide such as lauroyl peroxide, and benzoyl peroxide, an azo compound such as azobisisobutyronitrile, and a persulfate such as sodium persulfate, and light or radiant energy in the presence of or absence of a sensitizer.

Cationic Polymerization

Solution polymerization may be applicable in the presence of a polymerization initiator for cationic polymerization, e.g., a Lewis acid such as BF$_3$OEt$_2$, ZnOCl$_2$ or TiCl$_4$, or under irradiation of light or radiation energy.

Representative examples of vinylbiphenyl polymers obtained through radical polymerization or cationic polymerization are shown hereinbelow with their recurring units:

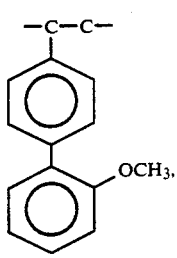
(1)

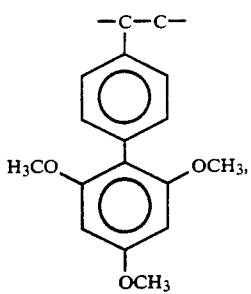
(2)

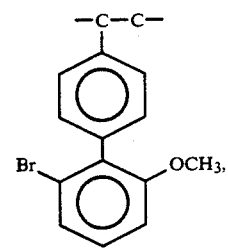
(3)

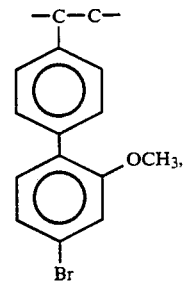
(4)

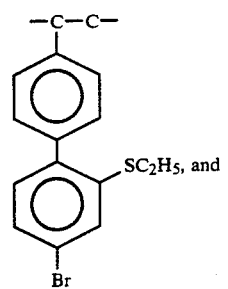
(5)

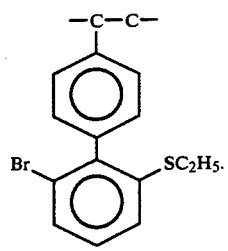
(6)

Polymer Reaction

As described above, the vinylbiphenyl polymer of the present invention may also be prepared by using a polymer of a halogenated styrene such as a chlorostyrene or a bromostyrene and subjecting the halogenated styrene polymer to dehalogenation coupling.

In a case where a monohalogenated monoalkoxybenzene is used as a coupling agent is used, for example, the dehalogenation coupling may be effected in two ways including one wherein a monohalogenated monoalkoxybenzene is once converted into a lithio complex (scheme (i) described below) and one wherein the coupling agent is directly subjected to dehalogenation coupling with the halogenated styrene polymer in the presence of a phase-transfer catalyst comprising a quarternary onium salt and a dehalogenation agent (scheme (ii) shown below). These reactions are represented by the following schemes:

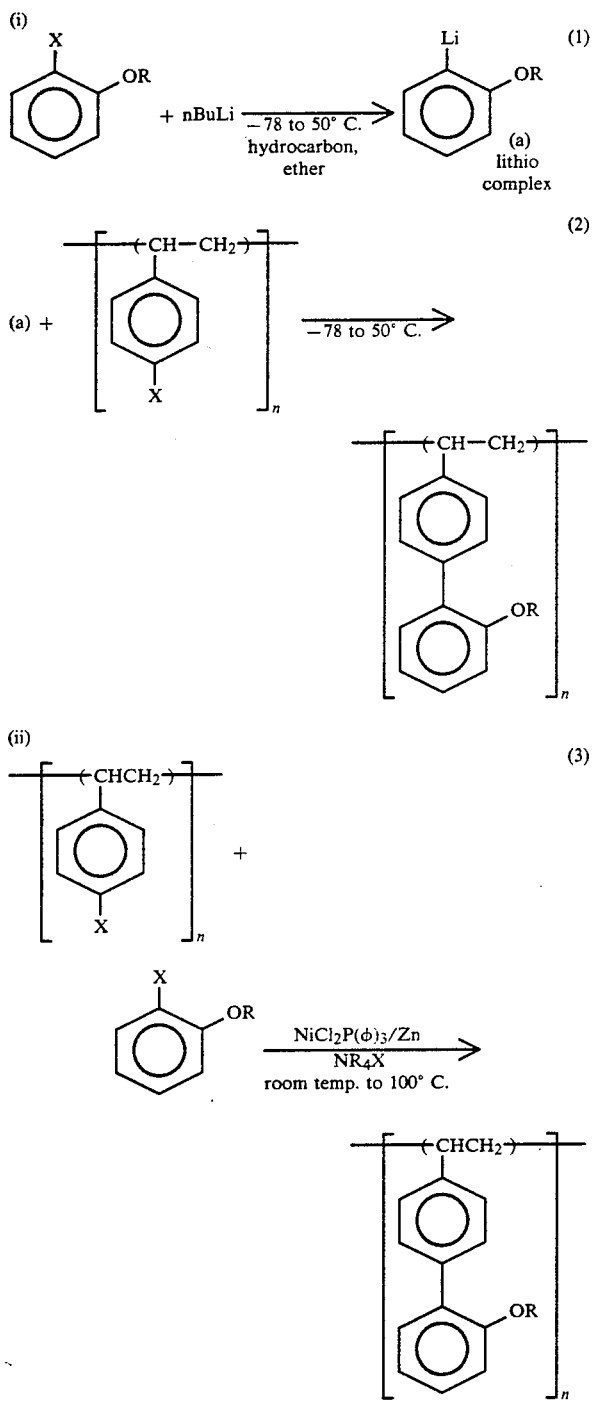

In the reaction using a lithio complex (i), LiX is produced as a by-product, but this is insoluble in most solvents applicable to the reaction so that it can be easily removed from the system. A lithio complex may also be formed from phenyllithium, other alkyllithium compounds such as amyllithium, or lithium metal.

When a lithio complex is reacted with a halogenated styrene polymer, the lithio complex need not be separated but the halogenated styrene polymer can be added to the reaction liquid of a halogenated alkoxybenzene and n-BuLi. The lithio complex is generally caused to be present in excess of the reaction equivalent so as to increase the reaction speed. The degree of the excess may be determined in connection with the other reaction conditions such as the reaction temperature, but the lithio complex may generally be used in the range of 1–5 equivalents.

In the reaction (ii), there is involved a difficulty that the alkoxybenzene derivative can be dimerized, but the reaction can be proceeded effectively at a low temperature by using a solvent dissolving the polymer and a solvent dissolving the alkoxybenzene derivative, and also a quarternary onium salt as a phase-transfer catalyst. In the reaction (ii), it is preferred that the ratio of NiX$_2$P$\phi_3$ ($\phi$: phenyl group) to Zn be set to around $\frac{1}{4}$, but the ratio may suitably be in the range of $\frac{1}{2}$–1/6. The group R in the quarternary onium salt may be methyl, ethyl, butyl, benzyl, etc. Further, crown compounds such as 15-crown-5, and 18-crown-6 may also be used instead of the onium salts. The quarternary onium salt may suitably be used in an amount of 4 times that of Ni by mol but may be used in the range of 0.5–20 times by mol without difficulty depending on other reaction conditions. The halogenated alkoxybenzene may be used in the range of 2–10 mols per mol of the halogenated phenyl unit constituting the polymer.

Examples of the polymer structural units (or recurring units) of the vinylbiphenyl polymers prepared by the polymer reaction include the following in addition to those exemplified above with respect to the polymerization reaction:

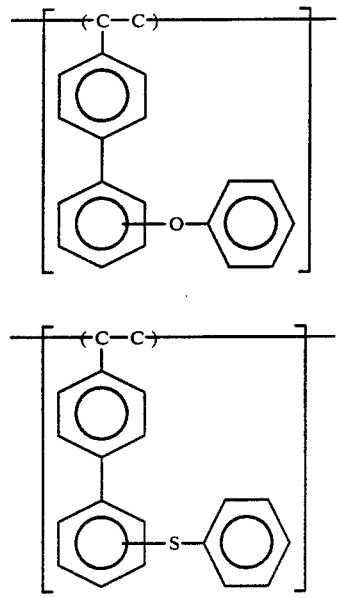

-continued

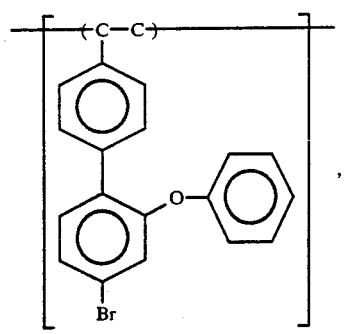

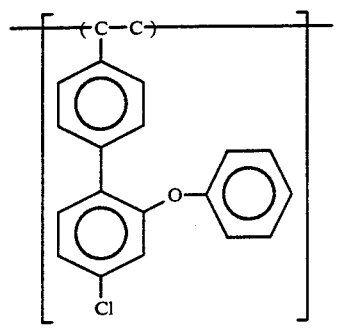

The structure of the vinylbiphenyl polymer of the present invention may be easily confirmed by $^1$H-NMR:
CH, CH$_2$: 1-2 ppm,
proton in benzene ring: 6-7.5 ppm.
All of these peaks represent fissions attributable to differences in stereospecificity. The OCH$_3$ peak is found at 3.5-4 ppm. The proton peaks vary depending on the substituted group used but may suitably be identified. As is well known in the art, it is also possible to determine the conversion from the spectrum intensity of $^1$H-NMR. For example, in the case of

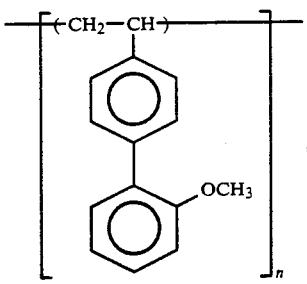

from the intensity ratio of CH$_3$ to the total of CH and CH$_2$, the rate of introduction of the alkoxybenzene derivative to the chloro- or bromo-styrene polymer can be determined, so that the completion of the reaction may be suggested by controlling the reaction to provide a unity with respect to the intensity ratio.

The polymers produced through the above mentioned various reactions may be recovered in an appropriate manner depending on the reaction system concerned and may conveniently be recovered by precipitation with methanol, followed by dissolution with methyl ethyl ketone and re-precipitation with methanol.

In this way, the polymer of the present invention may have a degree of polymerization n of 10 or above, preferably 50-10000.

The polymer of the present invention may be shaped into optical devices such as lenses and prisms through pressure molding, injection molding, extrusion molding, etc., based on its excellent optical characteristics, or may be used as a molding material for various other uses based on its transparency, moldability or moisture stability.

The present invention will be described more specifically with reference to specific examples.

EXAMPLE 1

In a glass autoclave with a stirrer, 10 g of p-bromostyrene and 3.5 g of 4-vinyl-2'-methoxybiphenyl was charged and mixed with benzene. The reaction system was replaced with nitrogen (N$_2$) and 0.21 g of benzoyl peroxide was added. Then, the reaction system was raised in temperature to 80° C.

After 5 hours, the temperature was lowered to room temperature, and the content was charged in a large amount of methanol to produce a precipitate, which was then filtered out and dried.

EXAMPLE 2

The procedure of Example 1 was repeated except that the charge rates were changed to 9 g of p-bromostyrene and 10.5 g of 4-vinyl-2'-methoxybiphenyl, whereby a polymer was obtained.

EXAMPLE 3

The procedure of Example 1 was repeated to produce a polymer except that the charge rates were changed to 3 g of p-bromostyrene and 10.5 g of 4-vinyl-2'-methoxybiphenyl.

EXAMPLE 4

The procedure of Example 1 was repeated to provide a polymer except that 10.5 g of 4-vinyl-2'-methoxybiphenyl alone was used.

EXAMPLE 5

Each of the polymers obtained in Examples 1-4 was subjected to measurement of composition. Further each of the polymers was dissolved in benzene and formed into a V-shaped prism, which was then subjected to refractive index measurement by means of a Pulfrich refractometer. The refractive indexes and Abbe's numbers of the polymers thus obtained are as follows:

| Example | Refractive index | Abbe's number |
| --- | --- | --- |
| 1 | 1.585 | 30 |
| 2 | 1.593 | 30 |
| 3 | 1.605 | 30 |
| 4 | 1.622 | 30 |

These values are plotted in FIG. 1 versus the proportion of the polymerized 4-vinyl-2'-methoxybiphenyl units (B) in the copolymer thereof with the p-bromostyrene units (A) as obtained through the elementary analysis.

Further, these polymers obtained in the above Examples 1-4 were respectively formed into a lens with a diameter of 20 mm and a curvature r=50. The chromatic aberrations of these lenses could be removed when they were respectively combined with a single concave lens of polydimethylsiloxane resin having a refractive index of 1.403 and an Abbe's number of 52.

EXAMPLE 6

10 g of p-bromostyrene was dissolved in 400 ml of benzene, and 0.08 g of azobisisobutyronitrile was added. After the oxygen was replaced with $N_2$ gas, the system was heated to 75° C. for 5 hours of reaction. The reaction mixture was poured in a large amount of methanol, and the precipitate was filtered and dried. The resultant polymer showed an intrinsic viscosity ($\eta$) of 1.2 in toluene at 25° C. In toluene, 11 g of o-bromothioanisol and 1.8 g of butyllithium were added and stirred for 2 hours under nitrogen gas stream. Then, the liquid was filtered through A4-glass filter to remove the precipitate (LiCl), and the filtrate was transferred into another vessel, to which a solution of 2 g of the poly-p-bromostyrene in 100 ml of toluene was added, followed by 6 hours of reaction at 20° C. After standing overnight, the reaction liquid was poured into a large amount of methanol to precipitate the polymer. The polymer was extracted by dimethoxyethane, and the extract liquid was poured into methanol to produce a precipitate, which was then dried. The resultant polymer showed a refractive index of 1.665 and an Abbe's number of 31.

EXAMPLE 7

10 g (0.078 mol) of p-chlorostyrene and 8 g of styrene were dissolved in 400 ml of benzene, and 0.12 g of azobisisobutyronitrile was added thereto. After replacement with dry nitrogen, the system was subjected to 4 hours of reaction at 75° C. to obtain a polymer. The polymer was dissolved in toluene. Then, 10.3 g of o-chlorothioanisol and 5 g of butyllithium were dissolved in toluene. Thereafter, an operation similar to that in Example 6 was conducted to obtain a polymer.

The polymer showed a refractive index of 1.609 and an Abbe's number of 25.

EXAMPLE 8

An ampule glass vessel containing 25 ml of benzene with 2 g of 4-vinyl-2'-methoxybiphenyl and 0.02 g of azobisisobutyronitrile dissolved therein, was evacuated through a vacuum line, sealed, and heated for 5 hours at 80° C. After opening the ampule, the content was charged in a large amount of methanol to form a precipitate, which was then filtered, dried and weighed. As a result, 1.2 g of a polymer was obtained.

The polymer was dissolved in THF (tetrahydrofuran) and subjected to GPC (gel-permeation chromatography), whereby the polymer was formed to have a molecular weight (calculated as polystyrene) of 12000.

40 mg of the polymer was dissolved in deuterium chloroform and subjected to $^1$H-NMR at room temperature by means of Valian VXR-300 NMR spectrometer, whereby an $OCH_3$ peak was observed at 3.65 ppm and it was almost equal to the total of the peaks of $C\underline{H}$ and $C\underline{H}_2$ at 1-2 ppm.

EXAMPLE 9

The operation of Example 8 was repeated except that 2 g of 4-vinyl-2'-methylthiobiphenyl was used instead of 2 g of 4-vinyl-2'-methoxybiphenyl, whereby 0.8 g of a polymer was obtained. The polymer showed a molecular weight of 9600.

EXAMPLE 10

10 g of p-chlorostyrene was dissolved in 400 ml of benzene, and 0.08 g of azobisisobutyronitrile was added. After the oxygen was replaced with $N_2$ gas, the system was heated to 75° C. for 5 hours of reaction. The reaction mixture was poured in a large amount of methanol, and the resultant precipitate of poly-p-chlorostyrene was filtered and dried.

The polymer showed a molecular weight of 12000 through measurement of the intrinsic viscosity in toluene at 25° C. In 100 ml of toluene, 4 g of o-chloroanisol and 1.8 g of butyllithium were added and stirred for about 2 hours under $N_2$ gas stream. The liquid was then filtered through 4A-glass filter to remove the precipitate (LiCl), and the filtrate was transferred into another vessel, to which a solution of 2 g of the above-obtained poly-p-chlorostyrene in 100 ml of toluene was added, followed by 6 hours of reaction. After standing overnight, the reaction liquid was poured into a large amount of methanol to precipitate the polymer. The polymer was extracted by dimethoxyethane, and the extract liquid was poured into methanol. The precipitated polymer was dried and subjected to measurement of $^1$H-NMR spectrum in the same manner as in Example 8, whereby an $OCH_3$ peak was similarly observed at 1-2 ppm.

EXAMPLE 11

A vinylbiphenyl polymer was prepared in the same manner as in Example 10 except that poly-p-bromostyrene obtained as in Example 10 by using p-bromostyrene instead of p-chlorostyrene, and o-bromoanisol were used. The polymer gave a peak of $OC\underline{H}_3$ through $^1$H-NMR measurement in the same manner as in Example 10.

EXAMPLE 12

Poly-2'-methylthio-biphenyl was obtained in the same manner as in Example 10 except that o-chlorothioanisol was used in place of o-chloroanisol.

EXAMPLE 13

4.6 g of 1-chloro-2,4,6-trimethylbenzene was dissolved in 50 ml of dehydrated toluene, and 6.4 ml of a butyllithium solution (30 wt/vol % in n-hexane) was added. After drying and stirring under $N_2$ gas stream for 2 hours, the mixture was filtered through 4A-glass filter to separate the precipitate. Into the filtrate solution, 2.75 g of poly(p-chlorostyrene) obtained in Example 10 was added, followed by stirring for 6 hours at 25° C. Thereafter, the reaction liquid was poured into a large amount of methanol to precipitate the polymer. The precipitated polymer was dissolved in methylene chloride and re-precipitated with methanol.

The polymer gave elementary analysis results of C=92.9 and H=7.1.

As a result of $^1$H-NMR measurement, a $C\underline{H}_3$ peak was observed at 2.2-2.3 ppm.

EXAMPLE 14

The moisture absorption was measured with respect to the polymers obtained in Examples 8, 9 and 13 according to the method of JIS K 7209. Each polymer was dissolved in methylene chloride and casted to provide a sample for the measurement. The results were as follows:

| Example | 8 | 9 | 13 |
| --- | --- | --- | --- |
| Moisture absorption | 0.03 | 0.04 | 0.02 |

EXAMPLE 15

Figure 2:
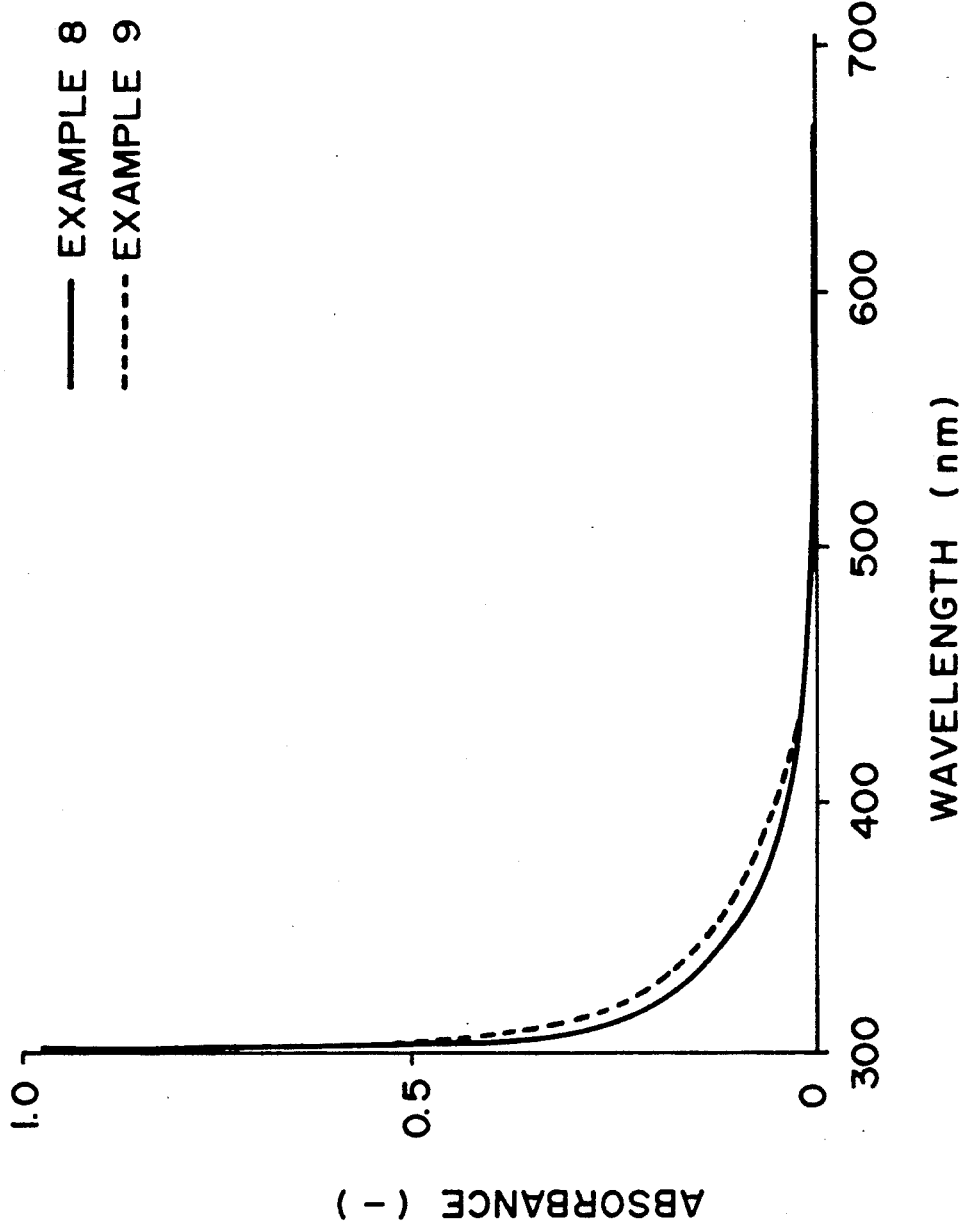
FIG. 2 is a graph showing spectral absorption curves of polymers in the form of solutions according to Examples 8 and 9 of the present invention appearing hereinafter.

The polymers of Examples 8 and 9 were dissolved in methylene chloride (absorbance at a wavelength over 260 nm: 0) and subjected to measurement of the absorbance by means of a spectrometer (UVDEC-650, mfd. by Bunko K.K.). The spectra thus obtained are shown in FIG. 2.

What is claimed is:

1. An optical device capable of a high refractive index, stability against moisture and effective transparency which comprises a lens or prism having an optical surface causing a refraction or reflection comprising: a shaped body of a polymer of (i) a vinylbiphenyl derivative having recurring units selected from those represented by the formulas:

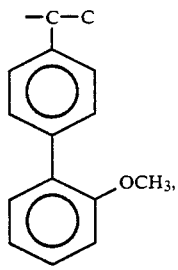
(1)

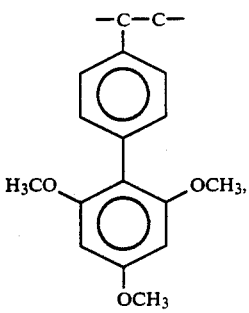
(2)

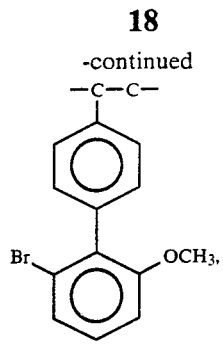
(3)

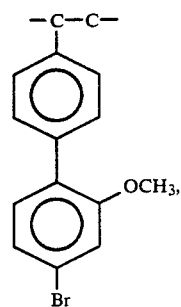
(4)

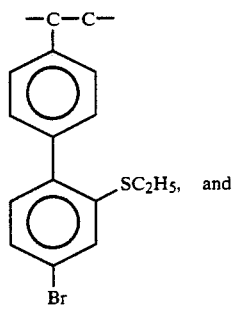
(5)

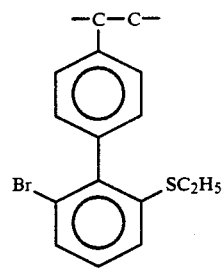
(6)

and of (ii) recurring units resulting from a monomer selected from the group consisting of methyl methacrylate, acrylonitrile, acrylic acid esters, dienes, vinylpyridine, maleic anhydride, fumaronitrile, vinyl ether, epoxy monomers, styrene monomers and halogenated styrenes having 1 to 5 halogen atoms selected from chlorine and bromine atoms, wherein the polymer has a refractive index from 1.57 to 1.75.

* * * * *

UNITED STATES PATENT AND TRADEMARK OFFICE
CERTIFICATE OF CORRECTION

PATENT NO. : 5,082,358
DATED : January 21, 1992
INVENTOR(S) : MASAYOSHI TABATA, ET AL.

It is certified that error appears in the above-identified patent and that said Letters Patent is hereby corrected as shown below:

COLUMN 1

Line 33, "number $v_v$" should read --number $v_d$--.

COLUMN 8

Line 35, "capable" should read --capable of--.

COLUMN 10

Line 66, "is used" (second occurrence) should be deleted.

COLUMN 12

Line 16, "can be proceeded" should read --can proceed--.

Signed and Sealed this

Twenty-eighth Day of September, 1993

Attest:

BRUCE LEHMAN

Attesting Officer

Commissioner of Patents and Trademarks